(12) United States Patent
Angerer et al.

(10) Patent No.: US 9,582,472 B2
(45) Date of Patent: *Feb. 28, 2017

(54) CONJUGATE GRADIENT SOLVERS FOR LINEAR SYSTEMS

(71) Applicant: INTERNATIONAL BUSINESS MACHINES CORPORATION, Armonk, NY (US)

(72) Inventors: Christoph M. Angerer, Zurich (CH); Konstantinos Bekas, Horgen (CH); Alessandro Curioni, Gattikon (CH); Silvio Dragone, Olten (CH); Christoph Hagleitner, Wallisellen (CH); Raphael C. Polig, Dietikon (CH)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/619,865

(22) Filed: Feb. 11, 2015

(65) Prior Publication Data
US 2015/0234781 A1   Aug. 20, 2015

(30) Foreign Application Priority Data
Feb. 20, 2014   (GB) .................................. 1403019.1

(51) Int. Cl.
G06F 7/32      (2006.01)
G06F 17/12    (2006.01)
G06F 17/16    (2006.01)

(52) U.S. Cl.
CPC .............. G06F 17/12 (2013.01); G06F 17/16 (2013.01)

(58) Field of Classification Search
CPC .................................. G06F 17/12; G06F 17/16
(Continued)

(56) References Cited

U.S. PATENT DOCUMENTS 8,548,776 B2   10/2013   Rodyushkin et al.
8,577,949 B2   11/2013   DeLaquil et al.
(Continued)

FOREIGN PATENT DOCUMENTS

WO    2010129711    11/2010

OTHER PUBLICATIONS

Dimond, R., et al. "Accelerating large-scale HPC Applications using FPGAs" 2011 20th IEEE Symposium on Computer Arithmetic. Jul. 2011. (2 Pages).
(Continued)

*Primary Examiner* — Tan V. Mai
(74) *Attorney, Agent, or Firm* — Tutunjian & Bitetto, P.C.; Keivan Razavi (57) ABSTRACT

A conjugate gradient solver apparatus is provided for generating data defining a solution vector x for a linear system represented by Ax=b where A is a predetermined matrix and b is a predetermined vector. The apparatus includes solver circuitry and a precision controller. The solver circuitry processes input data, defining said matrix A and vector b, in accordance with an iterative conjugate gradient method to generate said data defining the solution vector x. The solver circuitry is adapted to process data items, corresponding to vectors used in said conjugate gradient method, having a variable fixed-point data format. The precision controller determines the fixed-point data formats of respective said data items adaptively during progress of the conjugate gradient method in the solver circuitry.

15 Claims, 5 Drawing Sheets

(58) Field of Classification Search
USPC .......................................................... 708/446
See application file for complete search history.

(56) References Cited

U.S. PATENT DOCUMENTS

2011/0320768 A1    12/2011  Pell et al.
2014/0293904 A1*   10/2014  Dai ........................ H04B 7/024
                                                        370/329
2015/0106075 A1*    4/2015  Boys ...................... G05B 17/02
                                                        703/9

OTHER PUBLICATIONS

Gan, L., et al. "Accelerating Solvers for Global Atmospheric Equations Through Mixed-Precision Data Flowengine" 2013 23rd International Conference on Field Programmable Logic and Applications (FPL). Sep. 2013. (6 Pages).

Jerez, J., et al. "Fixed Point Lanczos: Sustaining TFLOP-equivalent Performance in FPGAs for Scientific Computing" 2012 IEEE 20th International Symposium on Field-Programmable Custom Computing Machines. May 2012. pp. 53-60.

Jerez, J., et al. "Towards a Fixed Point QP Solver for Predictive Control" 51st IEEE Conference on Decision and Control. Dec. 2012. pp. 675-680.

* cited by examiner

CONJUGATE GRADIENT SOLVERS FOR LINEAR SYSTEMS

BACKGROUND

Technical Field

The present invention relates generally to information processing and, in particular, to conjugate gradient solvers for linear systems.

Description of the Related Art

This invention relates generally to conjugate gradient solvers for linear systems of equations, and provides conjugate gradient solver apparatus for generating data defining a solution vector for such a linear system.

The solution of linear systems of equations is fundamental to numerous scientific and engineering applications. Efficient solution of large scale linear systems is critical for achieving high energy efficiency and fast turn-around times, as well as permitting handling of increasingly-complex problems in the real-world application in question.

Linear systems can be represented in general by $Ax=b$, where A is a (typically symmetric, positive-definite) matrix of dimensions $n \times n$ (i.e., n rows and n columns), and b is a vector of dimensions $n \times 1$ (n rows and 1 column). Linear system solvers provide processing apparatus for processing input data defining the elements of matrix A and vector b to generate data defining the solution vector x for the system. The processing operation can be performed in accordance with various known techniques for solving linear systems. These techniques can generally be divided into direct methods, which aim to provide a solution in a fixed number of steps, and iterative methods. Iterative methods aim to improve on a current solution in each successive iteration until a desired precision is achieved. The conjugate gradient method is a well-known technique which can be implemented as an iterative method for solving linear systems.

Through use of solver circuitry specifically adapted to the computational task in question, hardware linear system solvers can exploit the parallelism inherent in the solution process to offer efficient solver implementations. Use of a fixed-point data format for processing data items in the solver circuitry offers further efficiency advantages. Fixed-point solvers can be implemented with high computational density, low power, small circuit area and small data widths (e.g., 8 or 16 bits) for data items, enabling particularly fast and efficient operation. However, the small dynamic range offered by the fixed-point data format severely limits its application in linear system solvers. In general, fixed-point solvers can only be used in scenarios requiring very low precision or with a limited class of solution methods having constraints suited to a restricted dynamic range. One example involves the use of fixed-point solvers for implementing the Lanczos method after preconditioning of the input matrix A.

For linear system solvers based on the conjugate gradient method, use of a fixed-point data format would likely cause overflow errors and strongly distort the result. The solver would tend to abort after only a few iterations, returning a very inaccurate solution. To avoid this problem, state of the art conjugate gradient solvers use a floating-point data representation. While the floating-point format offers wide dynamic range, arithmetic operations are costly in terms of time, power and circuit area, frustrating the key objective of enhancing system efficiency.

SUMMARY

According to an aspect of the present principles, a conjugate gradient solver apparatus is provided for generating data defining a solution vector x for a linear system represented by $Ax=b$ where A is a predetermined matrix and b is a predetermined vector. The apparatus includes solver circuitry for processing input data, defining said matrix A and vector b, in accordance with an iterative conjugate gradient method to generate said data defining the solution vector x. The solver circuitry is adapted to process data items, corresponding to vectors used in said conjugate gradient method, having a variable fixed-point data format. The apparatus further includes a precision controller for determining the fixed-point data formats of respective said data items adaptively during progress of the conjugate gradient method in the solver circuitry.

According to another aspect of the present principles, a computer program product is provided. The computer program product includes a computer readable storage medium having program instructions embodied therewith, the program instructions readable by a computer having reconfigurable computing circuitry to cause the computer to perform a method. The method includes the step of configuring the reconfigurable computing circuitry to form solver circuitry and a precision controller. The method further includes the step of processing, by the solver circuitry, input data, defining a matrix A and a vector b, in accordance with an iterative conjugate gradient method to generate data defining a solution vector x for a linear system represented by $Ax=b$. Data items processed by the solver circuitry, corresponding to vectors used in said iterative conjugate gradient method, have a variable fixed-point data format. The method also includes determining, by the precision controller, fixed-point data formats of respective said data items adaptively during progress of the iterative conjugate gradient method in the solver circuitry.

According to yet another aspect of the present principles, a method is provided. The method includes the step of configuring the reconfigurable computing circuitry to form solver circuitry and a precision controller. The method further includes the step of processing, by the solver circuitry, input data, defining a matrix A and a vector b, in accordance with an iterative conjugate gradient method to generate data defining a solution vector x for a linear system represented by $Ax=b$. Data items processed by the solver circuitry, corresponding to vectors used in said iterative conjugate gradient method, have a variable fixed-point data format. The method also includes determining, by the precision controller, fixed-point data formats of respective said data items adaptively during progress of the iterative conjugate gradient method in the solver circuitry

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to conjugate gradient solvers for linear systems.

Figure 1:
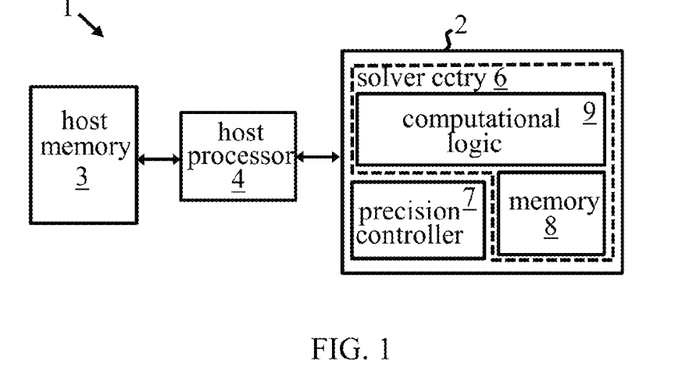
FIG. 1 is a schematic representation of a computing system 1 including solver apparatus 2, in accordance with an embodiment of the present principles.

FIG. 1 is a simplified schematic of a computing system 1 which includes a solver apparatus 2, in accordance with an embodiment of the present principles. The system 1 includes a host computer which includes reconfigurable computing circuitry implementing the solver apparatus 2. The reconfigurable computing circuitry is implemented here as an integrated circuit which can be connected to host computer 1 in any convenient manner, e.g., on a card which connects to the motherboard of the host. In this simplified diagram, host 1 includes a memory system, indicated generally at 3, and a host processor 4 which can communicate with solver apparatus 2 for solving a linear system represented by Ax=b, where the n×n matrix A and n×1 vector b are stored in host memory 3. The solver apparatus 2 includes solver circuitry 6 and a precision controller 7. The solver circuitry 6 includes memory 8, and computational logic 9 which includes compute hardware and control logic for implementing the various functions of the solver circuitry detailed below. Precision controller 7 provides the functionality for adaptive format variation during operation of the solver circuitry as described in detail below. In the particular example to be described, precision controller 7 is implemented by hardwired logic on the same chip as solver circuitry 6.

Figure 2:
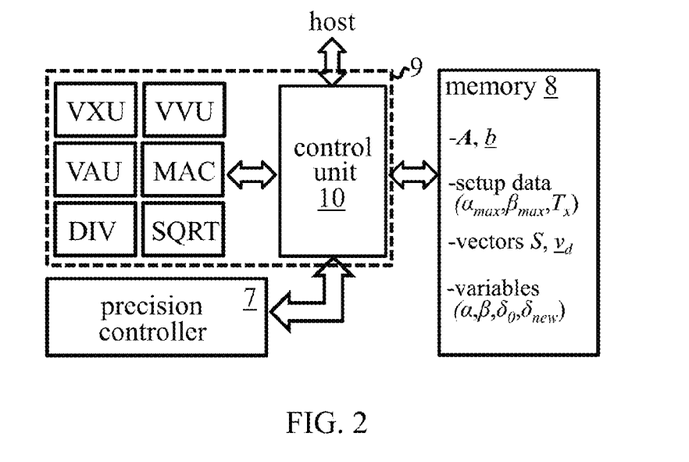
FIG. 2 is a more detailed schematic of the solver apparatus 2 of FIG. 1, in accordance with an embodiment of the present principles.

In this preferred embodiment, the solver apparatus is implemented by a field-programmable gate array (FPGA). These well-known circuits include multiple programmable logic components together with memory elements and a reconfigurable interconnect structure allowing configuration of the circuitry to implement desired functionality. Programming of an FPGA chip to a desired configuration can be achieved in known manner via associated computing equipment, e.g., host computer 1, using HDL (hardware description language) code. FIG. 2 is a more detailed schematic of the solver apparatus 2 illustrating the main functional modules implemented by the configuration of the FPGA circuitry, in accordance with an embodiment of the present principles. The computational logic 9 includes a vector expand unit VXU, a vector-by-vector unit VVU and a vector addition unit VAU. These hardware modules perform various vector processing operations described below. Additional hardware modules include a multiply-and-accumulate module MAC, a division module DIV and a square root module SQRT for performing more basic arithmetic operations. While a single instance of each module is shown for simplicity, in practice more than one instance of a given module may be provided in the solver circuitry to allow parallel operations to be conducted as appropriate. A control unit 10 controls operation of the solver circuit generally, controlling pipelining of operations via the solver modules to implement various processes detailed below. Control unit 10 includes memory management functionality for controlling storage and retrieval of data in solver memory 8. The control unit also controls communication of data between the solver circuitry 6 and precision controller 7, and manages communications with host 3 in operation. The functionality of control unit 10 may be implemented, in general, by hardware or software or a combination thereof, and suitable implementations will be apparent to those skilled in the art from the description herein. Memory 8 is indicated as storing various data used in the solution process. This includes: input data for the linear system to be solved, including matrix A, vector b and additional set-up data (parameters $\alpha_{max}$, $\beta_{max}$, and $T_x$, explained below) in this example; vector components S, $v_d$ (explained below) for various vectors used in the solution process; and values of process variables $\alpha$, $\beta$, $\delta_0$ and $\delta_{new}$ for the process to be described.

Figure 3:
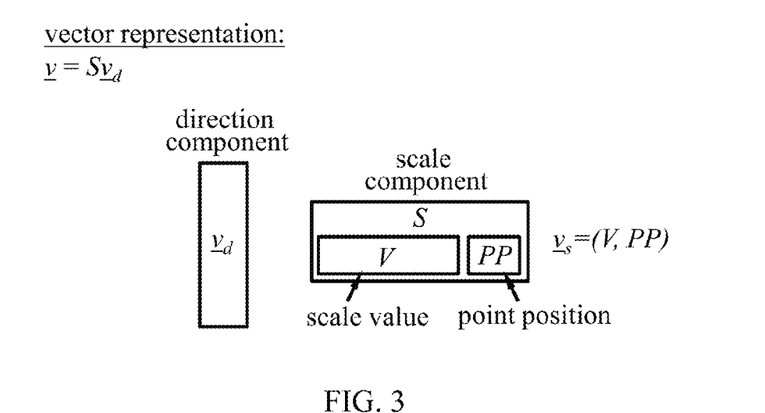
FIG. 3 is a diagram illustrating a component vector representation used in the solver apparatus 2, in accordance with an embodiment of the present principles.

In operation, after initial programming of the FGPA chip to the desired configuration of solver apparatus 2, application software running on host 1 controls interaction with the solver apparatus for solving the linear system Ax=b. Data defining the matrix A and vector b stored in host memory 3 is supplied as input to the solver 2. The input data is stored in memory 8 and then processed by the solver circuitry to generate data defining the solution vector x for the linear system. The solver circuitry 6 is adapted to generate the solution data in accordance with an iterative conjugate gradient method. The conventional conjugate gradient method can be expressed by the following algorithm:

$$Ax = b$$
$$d \leftarrow b$$
$$r \leftarrow b$$
$$\delta_0 \leftarrow r^T r$$
$$\delta_{new} \leftarrow \delta_0$$
$$\text{do}$$
$$\quad q \leftarrow Ad$$
$$\quad \alpha \leftarrow \delta_{new}/d^T q$$
$$\quad x \leftarrow x + \alpha d$$
$$\quad r \leftarrow r - \alpha q$$
$$\quad \delta_{old} \leftarrow \delta_{new}$$
$$\quad \delta_{new} \leftarrow r^T r$$
$$\quad \beta \leftarrow \delta_{new}/\delta_{old}$$
$$\quad d \leftarrow r + \beta d$$
$$\text{while } \delta_{new} > \epsilon^2 \delta_0$$

where $v^T$ denotes the vector transpose of a vector v and the parameter $\epsilon$ defines the convergence condition. The vectors q, x, r, d and process variables $\alpha$ and $\beta$ are unbounded in this process. As discussed earlier, therefore, conventional conjugate gradient solvers use a floating-point data format to provide the wide dynamic range necessary to avoid overflow errors. In contrast, the solver circuitry 6 of conjugate gradient solver 2 uses a fixed-point data format. In addition, the solver circuitry 6 is adapted to process particular data items, corresponding to vectors used in the conjugate gradient method, having a variable fixed-point data format. The precision controller 7 determines the fixed-point data formats of these data items adaptively during progress of the conjugate gradient method in the solver circuitry. For efficient implementation of the adaptive fixed-point processing, the solver circuitry 6 is adapted to process vectors used in the conjugate gradient method using a component-based vector format. With this format, each vector v is defined by a set of data items defining a direction vector $v_d$ and a scale component S, where $v=Sv_d$. The component-based vector representation used in the solver apparatus 2 is illustrated schematically in FIG. 3, in accordance with an embodiment of the present principles.

FIG. 3 shows the two components of a vector v, the direction component $v_d$ on the left in FIG. 3 and the scale component S on the right. The direction component $v_d$ is an n×1 unit vector, i.e., $norm_2(v_d)=1$. The scale component S is a single scalar fixed-point value defining the magnitude of vector v, i.e., $S=norm_2(v)$, whereby $v=Sv_d$. Since direction vector $v_d$ is a unit vector, all elements of this vector are between +1 and −1, whereby data items corresponding to these elements contain fractional bits only, and no integer bits. Precision for this vector component is thus determined entirely by the bit-width of data items corresponding to the vector elements of $v_d$. However, precision of all elements of the original vector v can be adjusted by varying precision of the single scale component S. Hence, solver 2 uses a variable fixed-point data format for data items corresponding to vector scale components S. In this preferred embodiment, the scale component S is defined by two data items. The first data item corresponds to a scale value V which may be of greater bit-width than items corresponding to the vector elements of $v_d$. The second data item corresponds to a point position PP which specifies the (variable) bit-position of the point location in the data item for scale value V. Hence, a scale component S can be represented as a two-element vector $v_s=(V, PP)$ as indicated in FIG. 3. The fixed-point format of data items representing scale component values V can thus be varied by setting the values of V and PP accordingly. As explained in detail below, precision controller 7 determines the formats of these data items adaptively in operation, and solver circuitry 6 interprets the data format accordingly when processing these data items.

Figure 4:
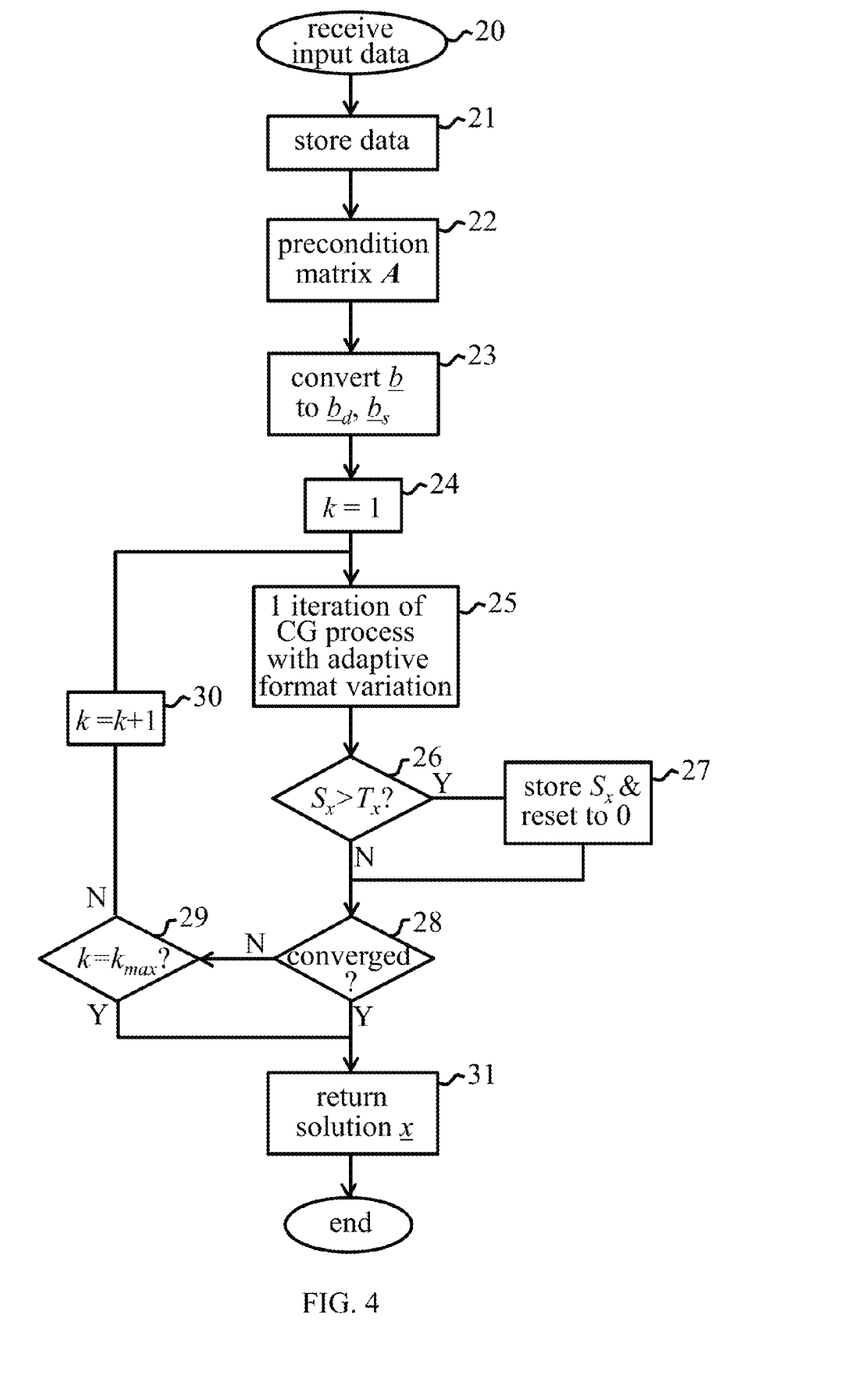
FIG. 4 is a flow chart indicating operation of the solver apparatus 2, in accordance with an embodiment of the present principles.

FIG. 4 shows a method performed by the solver apparatus 2, in accordance with an embodiment of the present principles. Operation begins, as indicated at step 20, on receipt from host 1 of the input data for the linear system to be solved. The input data defines the matrix A and vector b and includes additional set-up data for the solution process. The set-up data here includes bounding parameters $\alpha_{max}$ and $\beta_{max}$, and a threshold value $T_x$ as discussed further below. In step 21, control unit 10 of the solver stores the input data in memory 8. Next, in step 22, the control unit processes the data defining matrix A in order to precondition the matrix to a form in which the spectral radius $\rho(A)$ of the matrix is unity. Thus, instead of solving the original problem, namely Ax=b, we solve s precondition system defined as follows:

$$M_{kk} := \sum_{j=1}^{N} |A_{kj}|,$$

$$\hat{A}y = \hat{b}$$

where M is a positive diagonal matrix which can be easily inverted (to calculate the original solution x) and its elements are defined as follows:

$$M_{kk} := \Sigma_{j=1}^{N} |A_{kj}|$$

Applying this preconditioner leads to new matrix Â which has a spectral radius for 1.

This preconditioning step involves applying a transformation to the input matrix to achieve the desired spectral radius, and can be performed in known manner. This preconditioning step ensures that $norm(Av_d) \leq 1$ (since direction vectors $v_d$ are unit vectors), whereby the results of matrix multiplication operations required by the conjugate gradient method are restricted to values between +1 and −1.

In step 23 of FIG. 4, the control unit converts the input matrix b to the component-based format $Sb_d$, defined by scale vector $b_s$ and direction vector vectors $b_d$ as explained above. An iteration counter k is initialized to k=1 in step 24, and then in step 25, under control of control unit 10, the solver 2 performs one iteration of the conjugate gradient (CG) process detailed below. During this step, precision controller 7 performs adaptive format determination for vector scale components S as explained in more detail below. Next, in decision step 26, the control unit compares the scale component $S_x$ of a current solution vector ($x=S_xx_d$) for the current iteration with the threshold $T_x$ specified in the set-up data. If the scale component $S_x$ exceeds the threshold ("Y" at step 16), operation proceeds to step 27 in which control unit 10 stores the current value of $S_x$ in memory 8 and then resets $S_x$ for current solution vector x to zero for the next iteration. Operation then proceeds to step 28. Returning to step 26, if the current scale component $S_x$ does not exceed threshold $T_x$ ("N" at step 26), operation proceeds directly to step 28. In this decision step, control unit 10 determines if the convergence condition, defined below, is met for the system. If not, ("N" at step 28), the control unit checks in step 29 whether a predefined maximum number of iterations $k_{max}$ of the CG method have been performed. If not, the iteration count k is incremented in step 30, and operation reverts to step 25 for a further pass of the CG process. Steps 25 to 27 thus iterate until either convergence is detected in ("Y" at step 28) or $k_{max}$ iterations have been completed ("Y" at step 29). Operation then proceeds to step 31 wherein the control unit returns the current solution vector x to host 1 as the solution to the linear system. The process is then complete.

The FIG. 4 implementation of the conjugate gradient method can be expressed by the following algorithm in which vector operations are adapted to accommodate the component-based vector format described above. In this notation, $S_v$ denotes the scale component S of a vector v. Correspondence with the steps of FIG. 4 is indicated on the right hand side.

```
Ax = b
    scale A such that ρ(A) = 1                        (step 22)
    d ← component-based (b)
    r ← component-based (b)
    δ_0 ← r^T r == S_r^2
    δ_new ← δ_0
    do
        S_q ← S_d
        q_d ← Ad_d
        α ← min(δ_new/d^T q, α_max)
        S_x ← compute_scale(x, α, d)
        x_d ← compute_direction(x, α, d, S_x)
        if(S_x > threshold T_x) { send(S_x); S_x ← 0   (step 27)
        S_r ← compute_scale(r, -α, q)
        r_d ← compute_direction(r, -α, q, S_r)
        δ_old ← δ_new
        δ_new ← r^T r == S_r^2
        β ← min(δ_new / δ_old, β_max)
        S_d ← compute_scale(r, β, d)
        d_d ← compute_direction(r, β, d, S_d)
    while δ_new > ε^2 δ_0 and k < k_max                (steps
                                                       28 & 29)
```

Thus, $\delta_{new} > \epsilon^2 \delta_0$ defines the convergence condition for step 28 of FIG. 4. The compute_scale and compute_direction functions are defined as follows:
function $S_c$=compute_scale(a, s, b):
    acc=0 for i=1 . . . n do $$acc += (S_a * a_d(i) + s * S_b * b_d(i))^2$$

$S_c$=sqrt(acc)
where $a_d(i)$ denotes the $i^{th}$ element of direction vector $a_d$ and * denotes multiplication.
function $c_d$=compute_direction(a, s, b, $S_c$):
  parallel for i=1 . . . n do $$c_d(i) = (S_a * a_d(i) + s * S_b * b_d(i))/S_c$$

These functions are used to compute the scale and direction components $S_v, v_d$ of vectors x, r and d in the CG process above. After each implementation of the compute_scale function for these vectors, the appropriate format for the resulting scale component is determined by precision controller 7 as described below.

Figure 5:
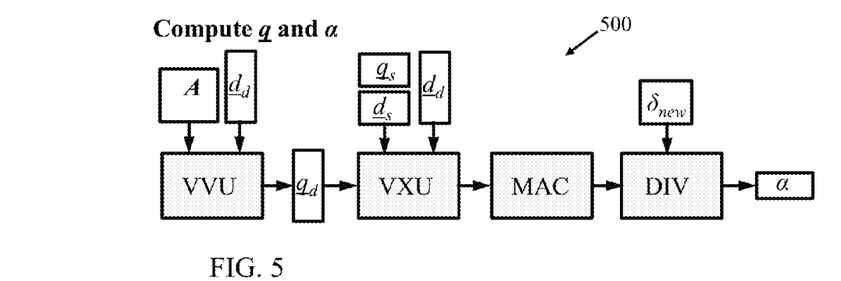
FIGS. 5-7 are dataflow diagrams for respective operations performed by the solver apparatus 2, in accordance with an embodiment of the present principles.
Figures 6, 7:
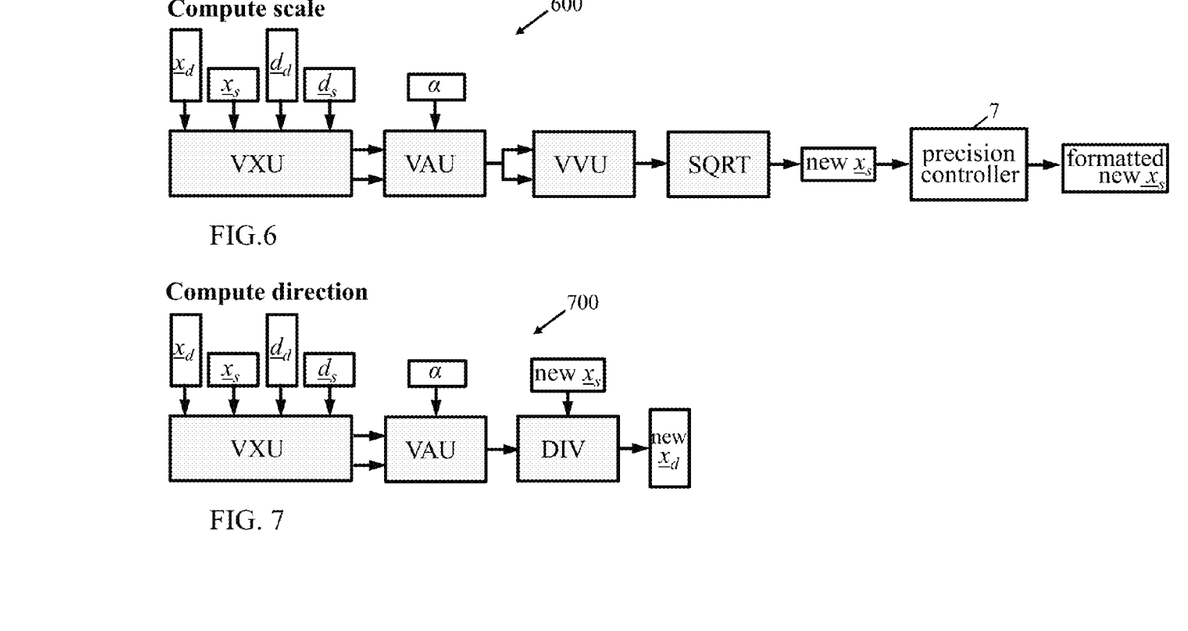

FIGS. 5-7 are dataflow diagrams indicating pipelining of key operations of the above process in the solver circuitry 6, in accordance with an embodiment of the present principles. The control unit 10 controls pipelining of operations via the hardware modules shown. Results are propagated from left to right and used immediately in the next module. FIG. 5 shows the dataflow 500 for computation of vector q and variable α. The vector-by-vector unit VVU receives the preconditioned matrix A and direction vector $d_d$. This unit calculates the vector dot product of each of the row vectors of A with direction vector $d_d$ to obtain the direction vector $q_d$. This vector is supplied to the vector expand unit VXU along with direction vector $d_d$ and the scale components of vectors d and q (represented here in vector format $d_s$ and $q_s$ as described above). The VXU module multiplies the scale components with their respective direction vectors to obtain the actual elements of each vector d and q. The multiply-and-accumulate module MAC then calculates $d^T*q$, and the result is divided into $\delta_{new}$, by the division module DIV to obtain α. Note that the actual value of α output here is bounded to a maximum value of $\alpha_{max}$ according to α←min $(\delta_{new}/d^Tq, \alpha_{max})$ in the algorithm above. A similar bound $\beta_{max}$ is used when calculating the variable β according to β←min$(\delta_{new}/\delta_{old}, \beta_{max})$ later in the algorithm.

FIG. 6 shows dataflow 600 for the compute scale operation, in this case for the scale component of vector x according to $S_x$←compute_scale(x, α, d), where $S_x$ is represented in the figure in vector format $\underline{x}_s$. The vector expand unit VXU multiplies the input direction and scale components to obtain the vectors d and q which are output to the vector addition unit VAU. This also receives a from the FIG. 5 stage and calculates new vector x as new x=x+αd. The resulting vector is supplied to two inputs of the vector-by-vector unit VVU which calculates new $x_s^2 = \Sigma$(new x(i)*new x(i)) for i=1 to n. The square root of the resulting sum is then calculated by the SQRT unit, and the output of this unit provides the new scale component "new $\underline{x}_s$". This is supplied to precision controller 7 which adapts the format as described below. The output of precision controller 7 provides the new scale component for vector x as used in subsequent steps of the CG process above.

The dataflow 700 for the compute direction operation for vector x according to $x_d$←compute_direction (x, α, d, new $\underline{x}_s$) is illustrated in FIG. 7. The vector expand unit VXU multiplies the direction vectors $x_d$ and $d_d$ with their corresponding scale components $x_s$ and $d_s$ to obtain the vectors x and d. These are output to the vector addition unit VAU which receives α from FIG. 5 stage and calculates new x=x+αd. This vector is output to the division unit DIV which also receives the new scale component new $\underline{x}_s$ from FIG. 6. The DIV unit normalizes the input vector new x to calculate the components of the new direction vector "new $x_d$" as new $x_d(i)$=newx(i)/new $x_s$. The resulting output "new $x_d$" constitutes the new direction vector $x_d$ for subsequent steps of the CG process.

The same basic operations shown in FIGS. 6 and 7 are used to compute the scale and direction components of vectors r and d as required for the CG process.

Figure 8:
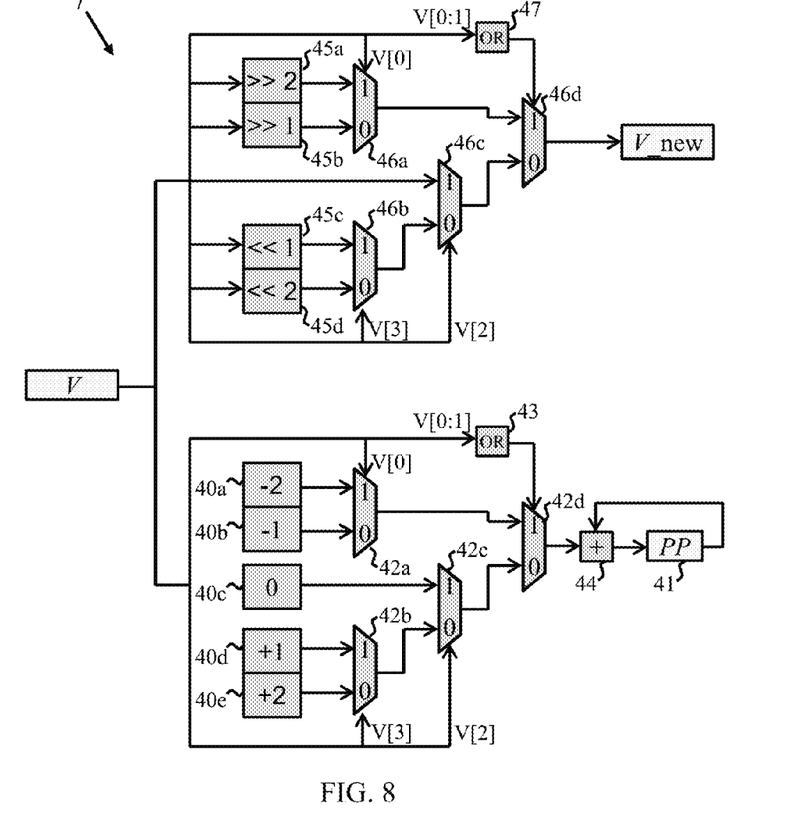
FIG. 8 is a schematic block diagram of a precision controller 7 of the solver apparatus 2, in accordance with an embodiment of the present principles.
Figure 9:
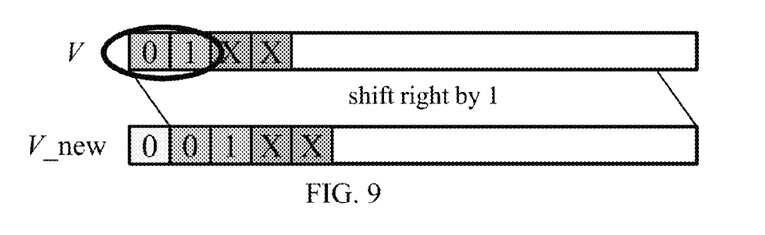
FIGS. 9-12 illustrate format adjustment operations performed by the precision controller 7 for different inputs, in accordance with an embodiment of the present principles.

Operation of precision controller 7 for formatting the vector scale components will now be explained. FIG. 8 is a schematic block diagram of the precision controller 7 of the solver apparatus 2, in accordance with an embodiment of the present principles. This includes an upper section, for calculating the new scale value V for a scale component $S_v$, and a lower section for calculating the new point-position PP for the scale component. The lower section of the apparatus includes registers 40a to 40e and 41 (which are preloaded with the values indicated), multiplexers 42a to 42d, an OR gate 43 and an adder 44 all connected as shown in the figure. The upper section includes shift registers 45a to 45d which shift an input bit sequence in the direction, and by the number of bits, indicated in each case, multiplexers 46a to 46d, and an OR gate 47 connected as shown.

In operation, the point-position PP of a newly-calculated scale component $v_s$ is preloaded to register 41. The bits of scale value V are supplied to shift registers 45a to 45d. In addition, one of the first four bits, denoted V[0:1:2:3] proceeding from left to right (most-significant to less-significant), is supplied to the control input of each of the multiplexers as indicated in the figure. The labels "0" and "1" on the multiplexers indicate which input is passed to the output for the corresponding control input bit-value. The two most-significant bits V[0:1] are supplied to OR gates 43 and 47.

Figure 10:
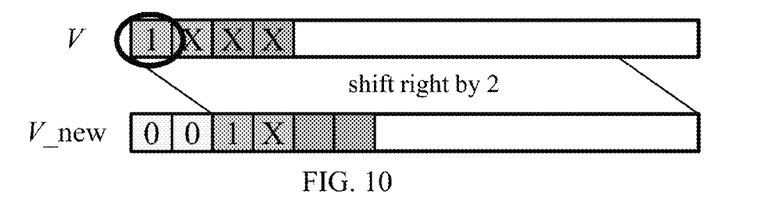
Figure 11:
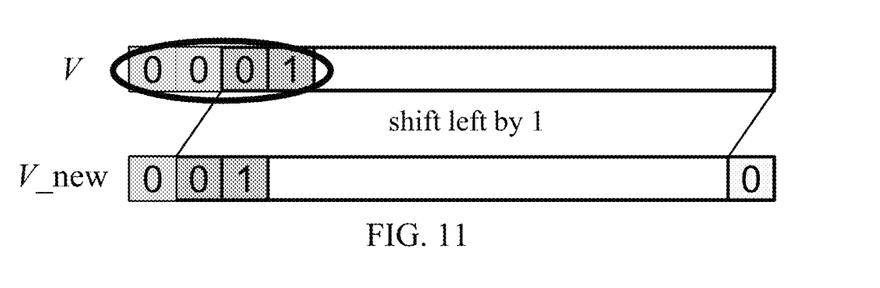
Figure 12:
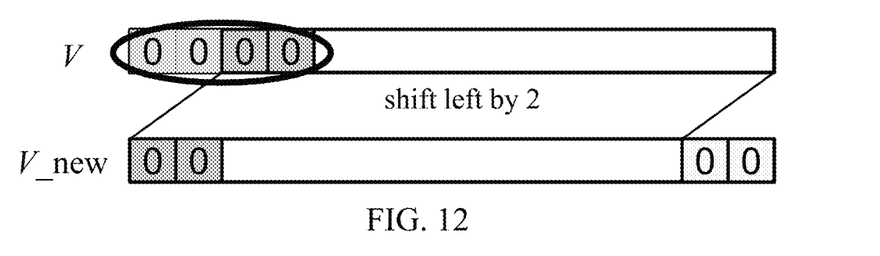

The precision controller operation is indicated in FIGS. 9a-9d. These figures indicate the input and output bit sequence of scale value V in FIG. 8 in four scenarios. FIG. 9 shows an input sequence with V[0:1:2:3]=01XX (where X="don't care"). In this case, precision controller 7 shifts the bit sequence one bit to the right, and the point position count PP is increased by one accordingly. If the input sequence has V[0:1:2:3]=1XXX as in FIG. 10, the precision controller shifts the bit sequence two bits to the right, and the point position count PP is increased by two. If the input sequence has V[0:1:2:3]=0001 as in FIG. 11, the precision controller shifts the bit sequence one bit to the left, and the point position count PP is decreased by one accordingly. If the input sequence has V[0:1:2:3]=0000 as in FIG. 12, the precision controller shifts the bit sequence two bits to the left, and the point position count PP is decreased by two. An input sequence with V[0:1:2:3]=001X results in no shift and hence no format change.

It can be seen that the precision controller is adapted to determine the fixed-point data formats of the data items corresponding to scale values V adaptively in dependence on results of processing steps during progress of the CG method. The format can thus be varied appropriately for each individual item as a given solving operation proceeds, actively adapting to conditions at different stages of the iterative process. As demonstrated in FIGS. 9-12, the precision controller adapts the scale component format such that precision varies in inverse relation to scale component value. Lower values are thus formatted to give higher precision and higher values are formatted to give lower precision. In this way, dynamic range is traded for precision as appropriate as the scale component values vary in operation. Since the scale components for vectors r and d tend to get smaller over time, the fixed point will generally be moved to the left for these components, giving increased precision in later iterations. In contrast, the scale component $S_x$ for vector x tends generally to increase, and this component cannot be bound because x is the solution vector. However, by storing and resetting $S_x$ as described above whenever threshold $T_x$ is exceeded, the stored scale values can be accumulated in memory 8 to give the final scale value for the solution vector. Overflow errors for this unbounded component are thereby avoided. Further overflow errors are avoided by bounding parameters α and β to respective maximum values $α_{max}$ and $β_{max}$ as described above. These values, and threshold value $T_x$, are configurable via the set-up data, permitting selection of appropriate values for a given linear system, e.g., via application software on host 1. Appropriate parameters ε, $k_{max}$ to be used in the iterative process may also be configurable via the setup data if desired.

The adaptive-format technique described above enables good results to be achieved in the fixed-point CG solver using simple, fast, and power-efficient operations. Compared to floating-point CG solvers, memory requirements are significantly lower providing a substantial performance gain. This is also coupled with enhanced power efficiency due to the significantly lower operational complexity. The adaptive fixed-point CG solver thus offers extremely efficient solution of linear systems.

Various changes can of course be envisaged to the exemplary embodiment described. For example, a variable data width can be readily accommodated with the fixed-point format used in the CG solver. In alternative embodiments, therefore, the solver circuitry may be configurable for processing data items having a variable bit-width. Precision in some embodiments may be adjusted by changing bit-widths in addition to the format variation described above. For example, the bit-width of data items corresponding to vector components and elements of matrix A may be configurable, e.g., specified in the set up data, allowing bit-widths to be preselected for a given operation. More sophisticated embodiments can be envisaged, however, where bit-widths are adjusted dynamically during operation. In particular, the precision controller may vary bit-widths adaptively as required during progress of the CG method. For example, the precision controller could dynamically vary the bit-width of vector scale components to vary precision and dynamic range according to requirements at a particular point in the process. In addition, since direction vectors $v_d$ are unit vectors, precision of direction vector elements can be easily increased/decreased simply by adding/removing bits on the right, i.e., least-significant bits.

Figure 13:
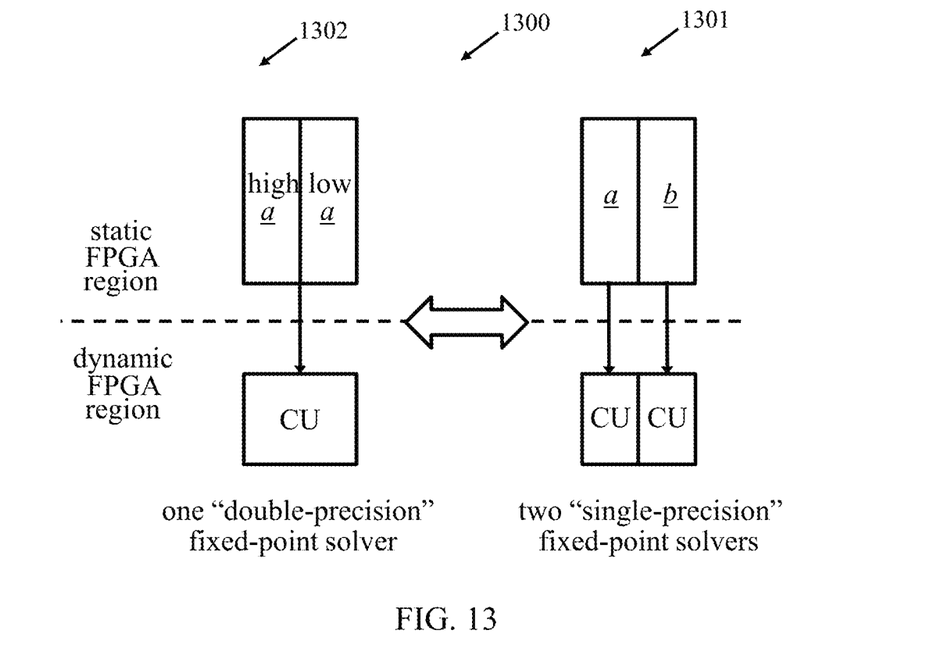
FIG. 13 shows an example 1300 of solver circuit reconfiguration for bit-width adjustment in the solver apparatus 2, in accordance with an embodiment of the present principles.

Accommodating a variable bit-width in the solver circuitry can be readily achieved by appropriate reconfiguration of circuit components. FIG. 13 shows an example 1300 of a solver circuit reconfiguration for bit-width adjustment in the solver apparatus 2, in accordance with an embodiment of the present principles. The diagram 1301 on the right of the figure illustrates a configuration in which two computational units CU use respective p-bit registers storing bit-strings a and b. The diagram 1302 on the left shows an alternative configuration in which a single computational unit uses both p-bit registers storing bit-strings "high a" and "low a", corresponding respectively to the p most-significant and p least-significant bits of a single bit-string. The same circuit elements can thus be configured to perform two "single-precision" operations or a single "double-precision" operation. By extending this principle to multiple circuit elements, the overall circuitry could be configured as a single "double-precision" fixed-point solver or two "single-precision" fixed-point solvers for parallel solution of different linear systems. While in some embodiments circuit reconfiguration may involve loss of data from memory elements, FPGAs with both static and dynamic regions provide for dynamic partial reconfiguration. In particular, if memory elements are contained in the static FPGA region and compute units in the dynamic region as indicated in FIG. 13, precision can be adapted without loss of data, avoiding the need to transfer and re-store intermediate result data on reconfiguration. Of course, while a simple single/double precision reconfigurable system is illustrated for simplicity here, in general configurations can be adapted as required to accommodate any desired precision variation.

While the solver apparatus is implemented using FPGAs above, other reconfigurable circuitry may of course be employed. Some embodiments, for instance, may be implemented using ASICs, though circuit options may then be constrained to a more limited number of configurations built-in specifically to the ASIC circuitry.

In the above system, the precision controller is implemented in hardware on the same chip as the solver circuitry. In other embodiments the precision controller could be implemented in software and/or separately of the solver circuitry, e.g., in a host computer of the overall system.

A CG solver embodying the invention may be implemented as a "stand-alone" solver for a linear system, with the solver precision being determined as desired for the system. Alternative embodiments may provide the inner solver for a mixed-precision system. These systems are well-known in the art, having a precise (higher precision) outer solver implementing an outer loop of the iterative solution process, and an imprecise (lower precision) inner solver implementing an inner loop of the process. As a particular example, a CG solver embodying the invention may provide the inner solver of a mixed-precision system.

According to an aspect of the present principles, a conjugate gradient solver apparatus is provided for generating data defining a solution vector x for a linear system represented by Ax=b where A is a predetermined matrix and b is a predetermined vector. The apparatus includes solver circuitry for processing input data, defining said matrix A and vector b, in accordance with an iterative conjugate gradient method to generate said data defining the solution vector x. The solver circuitry is adapted to process data items, corresponding to vectors used in said conjugate gradient method, having a variable fixed-point data format. The apparatus further includes a precision controller for determining the fixed-point data formats of respective said data items adaptively during progress of the conjugate gradient method in the solver circuitry.

The fixed-point data format used for data items is thus determined dynamically in operation and can be adapted according to actual conditions/requirements at different stages of the iterative solution process. The solver circuitry is adapted to accommodate the resulting variable fixed-point formats in processing of data items. This adaptive fixed-point format variation allows good results to be achieved while exploiting the simple, fast, and power-efficient operations available with fixed-point processing. Embodiments of the invention may thus offer significantly-improved operation compared to conventional fixed-point solvers, allowing implementation of the conjugate gradient method while avoiding the complexity and power-hungry operations associated with floating-point solvers.

In particularly simple implementations, the fixed-point data format may be adaptively varied simply by varying the point-position in the fixed-point format. Hence, the solver circuitry may be adapted to process data items having a fixed-point data format with a variable point-position, and the precision controller may be adapted to determine the point-positions for respective said data items adaptively during progress of the conjugate gradient method. Alternatively or in addition, however, the data width of the fixed-point format of data items may be variable in solver apparatus embodying the invention. Hence, the solver circuitry may be configurable for processing data items having a variable bit-width. Bit-widths could be preselected for individual solution processes and then remain fixed during a given process. More sophisticated embodiments can be envisaged, however, where bit-widths are adjusted dynamically during individual solution processes. In particular, the precision controller may be adapted to determine bit-widths for data items adaptively during progress of the conjugate gradient method. In any case, precision adjustment via bit-width alteration can be readily accommodated in solver apparatus embodying the invention.

In particularly preferred embodiments, the solver circuitry is adapted to process said vectors used in the conjugate gradient method using a component-based vector format wherein each vector v is defined by a set of data items defining a direction vector $v_d$ and a scale component S, where $v=Sv_d$ and $v_d$ is a unit vector. In these embodiments, all elements of a direction vector $v_d$ are between +1 and −1, requiring fractional bits only and no integer bits. This offers especially efficient solver implementations in which adaptive precision variation can be achieved by varying the fixed-point format for the scale component S only, e.g., simply by adaptive variation of the point-position for these components. In preferred embodiments, therefore, the precision controller is adapted to determine the fixed-point data formats of data items corresponding to respective scale components S adaptively during progress of the conjugate gradient method, and the solver circuitry is adapted to process said data items corresponding to scale components with a variable fixed-point data format. The precision controller is preferably adapted to determine the fixed-point data formats of data items corresponding to scale components S such that precision varies in inverse relation to scale component value. That is, lower values are formatted to give higher precision and higher values are formatted to give lower precision. In this way, necessary dynamic range can be traded for achievable precision at runtime.

To ensure that results of matrix multiplication operations required by the conjugate gradient method are restricted to values between +1 and −1, the solver circuitry is preferably adapted to implement a preconditioning step to precondition the matrix A. In particular, the solver circuitry is preferably adapted to process the input data defining the matrix A such that the spectral radius of the matrix is unity.

Various additional techniques are employed in preferred embodiments to inhibit overflow errors in operation of the solver circuitry. For example, successive iterations of the conjugate gradient method yield successive refinements of a current solution vector x. This solution vector x cannot be bound because it represents the result of the process. However, for each of successive iterations of the conjugate gradient method in preferred embodiments, the solver circuitry can be adapted:

to compare the scale component of a current solution vector x for the current iteration with a threshold; and
if said scale component exceeds the threshold, to store that scale component and then reset the scale component for said current solution vector x to zero.

In this way, the stored scale values for the solution vector x can be accumulated to give the final scale value, avoiding overflow errors for this vector during the iterative refinement process. In addition, the solver circuitry is preferably adapted to bound predetermined variables (in particular the variables, discussed further later, commonly denoted by $\alpha$ and $\beta$ computed during implementation of the conjugate gradient method to respective maximum values. The maximum values used here are ideally configurable in the solver. Hence, the solver circuitry may be adapted to define the maximum values in dependence on input set-up data for a given operation.

The solver circuitry in preferred embodiments conveniently includes an integrated circuit. While some implementations may utilize ASICs (application-specific integrated circuits), the solver circuitry preferably includes reconfigurable computing circuitry, in particular a reconfigurable integrated circuit such as a FPGA (field-programmable gate array). Such circuits can be readily configured by appropriate software, such as HDL (hardware description language) program code for FPGAs, to implement the solver circuitry by configuration and control of basic computational and memory components. The precision controller may be implemented in general in hardware or software or a combination thereof, and could be implemented separately of the solver circuitry, e.g., by a host computer, in some embodiments. Conveniently, however, the precision controller can be implemented in the same chip as the solver circuitry.

It will be appreciated that many other changes and modifications can be made to the exemplary embodiments described without departing from the scope of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A conjugate gradient solver apparatus for generating data defining a solution vector x for a linear system represented by Ax=b where A is a predetermined matrix and b is a predetermined vector, the apparatus comprising:
    solver circuitry for processing input data, defining said matrix A and vector b, in accordance with an iterative conjugate gradient method to generate said data defining the solution vector x, the solver circuitry processing data items, corresponding to vectors used in said iterative conjugate gradient method, having a variable fixed-point data format; and
    a precision controller for determining the fixed-point data formats of respective said data items adaptively during progress of the iterative conjugate gradient method in the solver circuitry.

2. The apparatus as claimed in claim 1, wherein the solver circuitry processes said vectors used in the iterative conjugate gradient method using a component-based vector format, wherein each vector v is defined by a set of data items defining a direction vector $v_d$ and a scale component S, wherein $v=Sv_d$ and $v_d$ is a unit vector.

3. The apparatus as claimed in claim 2, wherein the precision controller determines the fixed-point data formats of data items corresponding to respective scale components S adaptively during progress of the iterative conjugate gradient method, and wherein the solver circuitry processes said data items corresponding to scale components with a variable fixed-point data format.

4. The apparatus as claimed in claim 3, wherein the precision controller determines the fixed-point data formats of data items corresponding to scale components S such that precision varies in inverse relation to scale component value.

5. The apparatus as claimed in claim 2, wherein the solver circuitry processes the input data defining the matrix A such that a spectral radius of the matrix A is unity.

6. The apparatus as claimed in claim 2, wherein, for each of successive iterations of the iterative conjugate gradient method, the solver circuitry:
    compares the scale component of a current solution vector x for the current iteration with a threshold; and if said scale component exceeds the threshold, stores that scale component and then resets the scale component for said current solution vector x to zero.

7. The apparatus as claimed in claim 1, wherein the solver circuitry bounds predetermined variables computed during implementation of the iterative conjugate gradient method to respective maximum values.

8. The apparatus as claimed in claim 7, wherein the solver circuitry defines said maximum values in dependence on input set-up data.

9. The apparatus as claimed in claim 1, wherein the solver circuitry processes data items having a fixed-point data format with a variable point-position, and wherein the precision controller determines point-positions for respective said data items adaptively during progress of the iterative conjugate gradient method.

10. The apparatus as claimed in claim 1, wherein the solver circuitry is configurable for processing data items having a variable bit-width.

11. The apparatus as claimed in claim 1, wherein the solver circuitry comprises a reconfigurable integrated circuit.

12. A computer program product, the computer program product comprising a computer readable storage medium having program instructions embodied therewith, the program instructions readable by a computer having reconfigurable computing circuitry to cause the computer to perform a method comprising:

configuring the reconfigurable computing circuitry to form solver circuitry and a precision controller;

processing, by the solver circuitry, input data, defining a matrix A and a vector b, in accordance with an iterative conjugate gradient method to generate data defining a solution vector x for a linear system represented by Ax=b, wherein data items processed by the solver circuitry, corresponding to vectors used in said iterative conjugate gradient method, have a variable fixed-point data format; and determining, by the precision controller, fixed-point data formats of respective said data items adaptively during progress of the iterative conjugate gradient method in the solver circuitry.

13. The computer program product as claimed in claim 12, wherein said vectors used in the iterative conjugate gradient method are processed by the solver circuitry using a component-based vector format, wherein each vector v is defined by a set of data items defining a direction vector $v_d$ and a scale component S, wherein $v=Sv_d$ and $v_d$ is a unit vector.

14. The computer program product as claimed in claim 12, wherein the method causes the solver circuitry to bound predetermined variables computed during implementation of the iterative conjugate gradient method to respective maximum values.

15. The computer program product as claimed in claim 14, wherein the method causes the solver circuitry to define said maximum values in dependence on input set-up data.

* * * * *